United States Patent [19]
Gonzalez et al.

[11] Patent Number: 5,372,639
[45] Date of Patent: Dec. 13, 1994

[54] USE OF A BIMODAL DISTRIBUTION OF SCRUBS IN A PROCESS FOR COOLING A HOT GASEOUS SUSPENSION

[75] Inventors: Raul A. Gonzalez, Newark, Del.; Charles D. Musick, Waverly, Tenn.

[73] Assignee: E. I. du Pont de Nemours and Company, Wilmington, Del.

[21] Appl. No.: 114,642

[22] Filed: Sep. 3, 1993

[51] Int. Cl.⁵ ............................................. C09C 1/36
[52] U.S. Cl. .................................... 106/437; 423/77; 423/613
[58] Field of Search ................ 106/437; 423/613, 77

[56] References Cited

U.S. PATENT DOCUMENTS

| | | | |
|---|---|---|---|
| 2,899,278 | 8/1959 | Lewis | 23/202 |
| 3,511,308 | 5/1970 | Nerlinger | 165/1 |
| 4,462,979 | 7/1984 | Stevens et al. | 423/613 |
| 4,569,387 | 2/1986 | Hartmann et al. | 165/47 |
| 4,784,841 | 11/1988 | Hartmann et al. | 423/501 |
| 5,266,108 | 11/1993 | Hauck | 106/437 |

*Primary Examiner*—Karl Group
*Assistant Examiner*—Chris Gallo

[57] ABSTRACT

Disclosed is a process of using a bimodal distribution of scrubs in an externally cooled conduit during heat removal whereby a hot gaseous suspension containing pigmentary metal oxides is subjected to cooling. Effective heat transfer is provided. Pigmentary properties such as CBU and gloss are improved.

8 Claims, No Drawings

USE OF A BIMODAL DISTRIBUTION OF SCRUBS IN A PROCESS FOR COOLING A HOT GASEOUS SUSPENSION

BACKGROUND OF THE INVENTION

The present invention relates to use of a bimodal particle size distribution of scouring particles in a process for cooling a hot gaseous suspension of pigmentary metal oxides in an externally cooled conduit.

In producing pigmentary $TiO_2$ by oxidizing $TiCl_4$ in the vapor phase at from about 900° to 1600° C. with an oxygen-containing gas, a hot gaseous suspension of $TiO_2$ solids and free chlorine must be quickly cooled below 600° C. within about 1-60 seconds following discharge of the suspension from a reactor. This cooling is accomplished in a conduit, i.e., a flue so that undesired $TiO_2$ particle size growth is prevented and particle agglomeration is minimized. Pigment product properties such as carbon black undertone (CBU) and gloss are a function of primary particle size and particle agglomeration, respectively.

The conduit is generally cooled externally with flowing water. The fine $TiO_2$, however, has a strong tendency to deposit in adherent layers on the inner walls of the conduits. Good heat transfer can be maintained by minimizing the adherent layers by adding scouring particles, i.e., scrubs. For example, U.S. Pat. No. 2,721,626 solves this surface coating problem by introducing relatively dense, hard abrasive particles into the hot suspension. The specific scrubs mentioned are sand, sintered particles of titanium dioxide, mullite or refractory alumina particles. The particle size range disclosed is from 100 mesh to ¼ inch. No mention is made of particle size distribution of the added scrubs. U.S. Pat. No. 3,511,308 provides a further improvement by adding a particulate, anhydrous, water-soluble salt having a melting point above about 700° C. and a hardness on the Mohr scale not greater than about 5. The particle size range disclosed is from 100 mesh to 4 mesh. Again, no mention is made of particle size distribution of the added scrubs.

This invention is yet another advance in a process for cooling a hot suspension of fine solids in a gas wherein the suspension is passed through an externally cooled conduit. There is a need to further improve the pigment properties such that having an average primary particle size from about 0.05 to about 0.5 microns produces a desirable CBU and minimizing agglomeration results in increased gloss. There is a concomitant need to maintain higher production rates without quality loss. The present invention meets these needs.

SUMMARY OF THE INVENTION

In accordance with this invention, there is provided a process for cooling a hot gaseous suspension of pigmentary metal oxides such as particulate $TiO_2$, $SiO_2$ and iron oxides by passing the suspension through an externally cooled conduit and introducing into the reaction mass a bimodal particle size distribution comprising:
(a) primary scouring particles having a particle size distribution of from about 30 mesh to about 3 mesh; and
(b) secondary particles having a particle size distribution of from about 100 mesh to about 10 mesh.

DETAILED DESCRIPTION OF THE INVENTION

The process for producing $TiO_2$ pigment by reacting $O_2$ and $TiCl_4$ in the vapor phase is known. The reaction is extremely fast and is followed by a brief period of particle growth which stops when the reaction mass is cooled enough by heat transfer through the walls of conduit, i.e., flue immersed in water. Part of the $TiO_2$ has a strong tendency to deposit on the inner walls of the cooling flues which reduces the cooling rate of the reaction mass thereby affecting the quality of the pigment formed. It has been found that use of a bimodal particle size distribution of scrubs substantially improves the quality of pigment formed at the particle growth stage, and allows higher production rates without quality loss. "Bimodal" is used herein to refer to a dual or two mode particle size distribution.

The scouring particles can be any material that removes pigmentary metal oxides such as $TiO_2$ adhered to the interior walls of the cooling conduit. Suitable scouring particles include, but are not limited to sand, sintered particles of $TiO_2$, mullite or refractory alumina particles, anhydrous water soluble salts, compacted $TiO_2$ such as, for example, that disclosed in copending U.S. patent application Ser. No. 07/872,206, which is incorporated herein by reference or mixtures thereof. Anhydrous water soluble salts comprise sodium chloride, potassium chloride, calcium chloride, magnesium chloride, sodium sulphate, aluminum sulphate, sodium aluminate, sodium phosphate and magnesium sulphate. Preferred scouring particles include sintered particles of $TiO_2$, compacted particles of $TiO_2$ and water soluble salts such as sodium chloride.

The amount of scrubs used is variable and will depend upon the particular needs. Typically, the addition of an amount of scrubbing solids ranging from about 0.5 to 20 wt % scrubs-solids, based on total $TiO_2$ suspended solids will be found adequate to effect desired removal of accumulated pigment deposit and allow a relatively high, uniform rate of heat removal from the product stream. The primary scrubs amount to about 0.5 to 10 wt % and the secondary scrubs amount to about 0.5 to 10 wt % based on total $TiO_2$ suspended solids. It will be appreciated by those skilled in the art that enough scrubs muse be added to bring the reaction mass at the end of the conduit to a temperature compatible with downstream process equipment such as cyclones, filters, screw conveyors, recycle compressors, etc., i.e., about 100° to about 600° C.

The scrubs can be added to the flue by any suitable means. For example, the scrubs can be added intermittently or continuously by gravity from a hopper (or bin) through a solids metering valve to the flue. Continuous feeding to the $TiO_2$ suspension under treatment is preferred. Feeding the scrubs to the flue may be accomplished by two separate hoppers, i.e., one for coarser particle size scrubs and the other for finer particle size scrubs. Alternatively, feeding may be accomplished from a single hopper containing the coarser scrubs through two parallel solids metering valves and generating the finer scrubs by grinding in one of the lines. The scrubbing solids may be added at any convenient point in the system but are typically most conveniently added to the reactor or product stream as it discharges from the reactor or at any convenient point along the cooling conduit. The solids may be added at a multiple of addition points and especially at those points adjacent to which a relatively severe build-up occurs due to the configuration of the apparatus, such as at return or other forms of bends employed in the system. Nonetheless, the particle size is determined rapidly and so it is preferred to add the scrubs to the product stream as it discharges from the reactor, i.e., at the front end of the flue.

Various forms of heat exchangers characterized as conduits or flues and externally cooled, preferably by water, may be used in the process of this invention. Examples include, but are not limited to, conventional round pipes and conduits that are described in greater detail in U.S. Pat. Nos. 2,721,626, 3,511,308, 4,462,979 and 4,569,387. Preferred conduits are described in U.S. Pat. No. 4,937,064 issued Jun. 26, 1990, the teachings of which are incorporated herein by reference. The conduit described therein has a plurality of protuberances (fins), and/or depressions. A preferred embodiment is a conduit having internal fins. It has been found that this invention can result in protuberances (fins) and/or depressions to be scoured more effectively, and more efficiently at the front end of the fin flue as well as the remainder of the conduit. The benefits of this invention may be especially apparent as the diameter of the conduit is increased.

Removal of the bimodal scrubs from the product poses no significant problems over that of conventional scrubs. Salt scrubs can be removed by washing during normal wet treatment, and $TiO_2$ scrubs, e.g., by screening.

The many advantages of the invention will be apparent from the foregoing description and following exemplification. In general, it affords a novel means for effecting cooling of hot suspensions of pigmentary metal oxides such as particulate $TiO_2$ in corrosive, chlorine-containing gases by a rapid and efficient heat-exchange technique, minimizing the deleterious effect which build-up of the cooled solids on the surfaces would otherwise produce. The process of this invention thereby results in improved $TiO_2$ pigment product properties by control of the primary particle size and level of agglomeration. Minimal variations in CBU are observed. Moreover, the bimodal distribution allows for higher production rates to be maintained without quality loss. In addition, the bimodal scrubs disperse more efficiently and provide a means to cool down effectively at the front end of the flue where pigmentary properties are set as well as the remainder of the flue where the pigment is brought down to reasonably low temperatures for handling.

To a clearer understanding of the invention, the following examples are illustrative but none are to be construed as limitative of the underlying principles of the invention. The entire disclosure of all patents cited below are incorporated herein by reference.

EXAMPLES

Examples 1–5

Employing a vapor phase oxidation reactor described in U.S. Pat. Nos. 2,488,439, 2,488,440, 2,559,638, 2,833,627, 3,208,866, and 3,505,091; and utilizing a type of flue described in U.S. Patent 4,937,064, a series of trials were run using sodium chloride scrubs having bimodal particle size distribution as compared with conventional scrubs having normal distribution. Process and additive conditions (rate, pressure, temperatures, purges, and concentration of additives such as $AlCl_3$, KCl or CsCl etc.) were held constant throughout each trial.

The scrubs were added continuously to the product stream, from a hopper, through a solids metering valve, about 5 ft. downstream from where the reaction initiated. The scrubs were fed from two separate hoppers and solids metering valves.

$TiO_2$ pigment products from the examples were tested for Carbon Black Undertone (CBU), a measure of particle size. The higher the CBU, the smaller the particles. A typical CBU for $TiO_2$ pigment used in paint is about 10. CBU is determined by mulling together a suitable liquid, such as light colored oil, and standard weights of the sample and a standard carbon black. The mixture is spread with a standard mixture on a panel and the relative blueness of the gray mixtures observed. Finer particles give bluer undertone or higher CBU. CBU is described in greater detail in U.S. Pat. No. 2,488,440.

Particle size distribution of the pigment products from the examples was measured by sedimentation analysis, with a Sedigraph ® (Micromeritics Instrument Corp., Norcross, Ga.), after dispersion in aqueous suspension by fixed level sonication. The particle size measurement of the oxidation base and the % >0.6 microns will indicate the potential for peak gloss, a value that cannot be exceeded while applying any reasonable energy level. In addition, less energy is required with improving the quality of the oxidation base.

Table I shows particle size distributions of (a) salt scrubs as typically used in $TiO_2$ plant practice and used for a control in these examples, (b) fine salt scrubs added to (a) to provide bimodal size distribution, and (c) finer salt scrubs added to (a) to provide bimodal size distribution.

Table II shows that bimodal particle size distribution of the scrubs has increased CBU and decreased coarse particle content of the $TiO_2$ pigment product. Minimal variations in CBU were also observed. Feed rates for the control and fine scrubs are shown as weight percent of $TiO_2$ production rate. For Examples 4 and 5, the diameter of the flue was increased 25%.

TABLE I

| Screen No. | Screen Opening (in.) | % Retained | Cum. % Retained |
|---|---|---|---|
| (a) Control Salt for Examples 1–5 | | | |
| 6 | 0.132 | 28.7 | 28.7 |
| 10 | 0.0787 | 44.9 | 73.6 |
| 14 | 0.0555 | 11.4 | 85.0 |
| 16 | 0.0469 | 2.8 | 87.8 |
| 20 | 0.0331 | 3.1 | 90.8 |
| Pan | | 9.2 | 100.0 |
| (b) Fine Salt for Examples 2–4 | | | |
| 10 | 0.0787 | 0.09 | 0.09 |
| 14 | 0.0555 | 5.23 | 5.32 |
| 16 | 0.0469 | 16.69 | 22.01 |
| 20 | 0.0331 | 32.87 | 54.88 |
| 30 | 0.0234 | 27.25 | 82.13 |
| Pan | | 17.86 | 99.99 |
| (c) Finer Salt for Example 5 | | | |
| 20 | 0.0331 | 0.02 | 0.02 |
| 30 | 0.0234 | 8.28 | 8.30 |
| 40 | 0.0165 | 45.40 | 53.70 |
| 50 | 0.0117 | 37.70 | 91.40 |
| 60 | 0.0098 | 7.78 | 99.18 |
| 80 | 0.0070 | 0.82 | 100.00 |

TABLE II

Effects of Bimodal Scrubs

| Scrubs Rate wt. % of TiO$_2$ | | | % |
|---|---|---|---|
| Control | Fine | CBU | >0.6μ |
| *Example 1* | | | |
| 6.9 | 0.0 | 11.1 | 31.4 |
| 9.9 | 0.0 | 11.0 | 30.0 |
| *Example 2* | | | |
| 8.5 | 0.0 | 8.7 | 33.5 |
| 8.5 | 3.2 | 10.2 | 29.2 |
| *Example 3* | | | |
| 7.1 | 0.0 | 9.6 | 37.1 |
| 7.1 | 0.7 | 10.1 | 34.8 |
| 7.1 | 1.2 | 10.2 | 35.2 |
| 7.1 | 2.3 | 10.4 | 33.1 |
| *Example 4* | | | |
| 6.6 | 0.0 | 10.5 | 23.8 |
| 6.6 | 3.0 | 10.9 | 21.1 |
| *Example 5* | | | |
| 6.6 | 0.0 | 10.9 | 22.4 |
| 6.6 | 3.5 | 12.5 | 16.7 |

What is claimed is:

1. In a process for cooling a hot gaseous suspension of pigmentary metal oxides by passing the suspension through an externally cooled conduit, the improvement comprising, introducing into the reaction mass a bimodal particle size distribution comprising:
   (a) primary scouring particles having a particle size distribution of from about 30 mesh to about 3 mesh; and
   (b) secondary particles having a particle size distribution of from about 100 mesh to about 10 mesh.

2. The process of claim 1 wherein the pigmentary metal oxide is particulate TiO$_2$.

3. The process of claim 2 wherein the primary and secondary particles are selected from the group consisting of sand, sintered particles of TiO$_2$, mullite, refractory alumina particles, anhydrous water soluble salts, compacted particles of TiO$_2$ and mixtures thereof.

4. The process of claim 2 wherein the primary and secondary particles are selected from the group consisting of sintered particles of TiO$_2$, compacted particles of TiO$_2$, sodium chloride and mixtures thereof.

5. The process of claim 4 wherein the primary and secondary particle is sodium chloride.

6. The process of claim 4 wherein the primary and secondary particle is compacted particles of TiO$_2$.

7. The process of claim 4 wherein the primary and secondary particle is sintered particles of TiO$_2$.

8. The process of claims 1-7 wherein the conduit has a plurality of protuberances, depressions or both which extend longitudinally along the interior surface of said conduit.

* * * * *